United States Patent [19]
Jones

[11] 3,854,828

[45] Dec. 17, 1974

[54] THREADED MOUNTING SLEEVE WITH RELATIVELY PIVOTABLE END SECTIONS

[76] Inventor: John P. Jones, 900 Saturn Dr., Apt. 304, Colorado Springs, Colo. 80906

[22] Filed: Mar. 21, 1973

[21] Appl. No.: 343,483

[52] U.S. Cl............... 403/100, 403/102, 403/118, 403/307, 108/129, 248/188.6
[51] Int. Cl............................................. F16l 27/0
[58] Field of Search....... 403/72, 83, 100, 102, 118, 403/306, 307, 343; 108/129; 248/188, 188.6; 16/147; 280/287

[56] References Cited
UNITED STATES PATENTS

| | | | |
|---|---|---|---|
| 561,665 | 6/1896 | Hubbell | 403/100 |
| 952,871 | 3/1910 | Browder | 403/102 |
| 1,237,056 | 8/1917 | Kitchen | 403/343 |
| 1,874,424 | 8/1932 | Benson | 403/83 |
| 2,606,802 | 8/1952 | Inpyn | 108/129 |
| 3,181,542 | 5/1965 | Bareis | 403/102 |

*Primary Examiner*—Jordan Franklin
*Assistant Examiner*—Conrad L. Berman
*Attorney, Agent, or Firm*—Clarence A. O'Brien; Harvey B. Jacobson

[57] ABSTRACT

An assembly is provided comprising first and second sections pivotally supported from each other for relative angular displacement about a predetermined axis between first and second relative positions. The sections have threaded bores formed therein which are coaxial when the sections are in the first positions and one of the bores comprises a through bore. An elongated member is provided and threaded on one end for threaded engagement through the through bore and into the other threaded bore when the sections are in the first positions thereof. The threaded engagement of the threaded end of the elongated member through the through bore and into the other bore locks the sections against relative displacement relative to each other.

6 Claims, 9 Drawing Figures

PATENTED DEC 17 1974  3,854,828
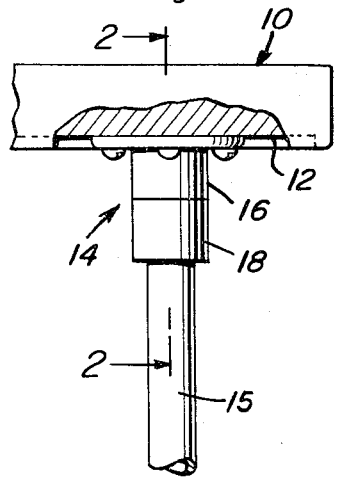
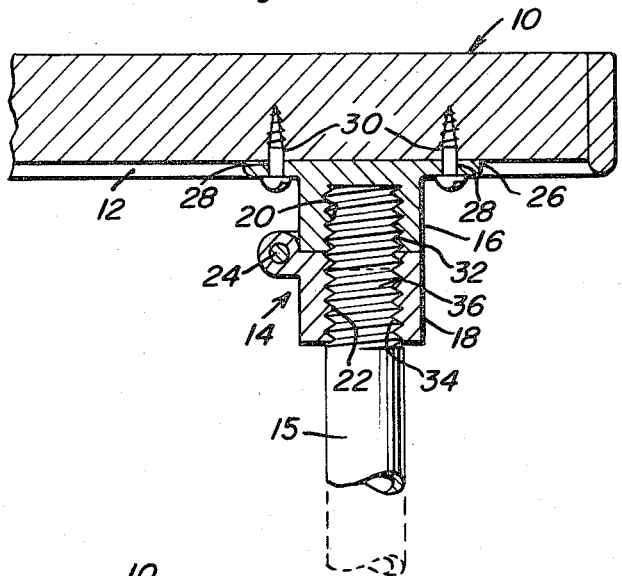
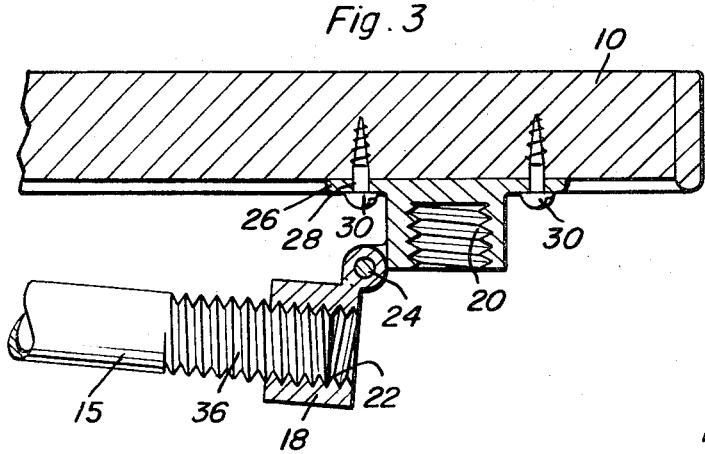
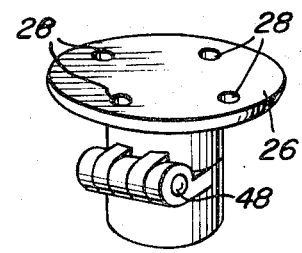
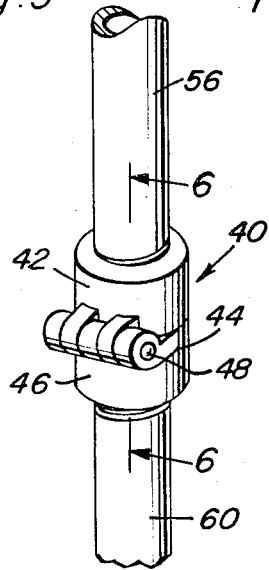
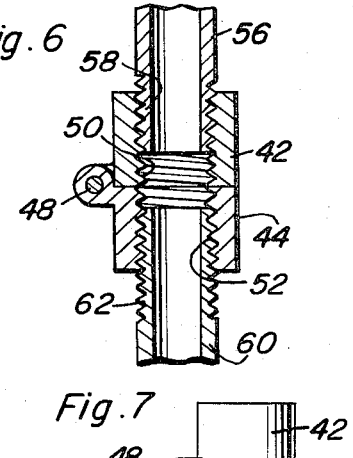
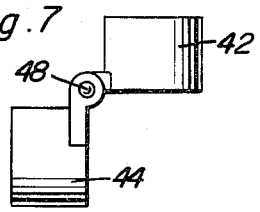
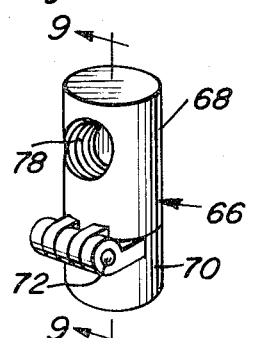
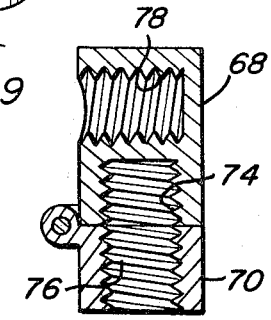

THREADED MOUNTING SLEEVE WITH RELATIVELY PIVOTABLE END SECTIONS

The connecting assembly of the instant invention may be utilized for several different purposes. The assembly may form hinge assemblies for pivotally attaching legs to a table, pivotally supporting brackets from a wall and pivotally joining adjacent pipe section ends. The connecting assembly may be constructed of any suitable material and may be utilized in various environments.

The main object of this invention is to provide a connecting assembly for joining components together in a manner such that they may be releasably locked in predetermined position and yet angularly displaced relative to each other, when desired.

Another object of this invention is to provide a connecting assembly in accordance with the preceding object and which will perform the desired function with a minimum of hardware and an apparatus requiring only simple and inexpensive manufacturing processes.

Another important object of this invention is to provide a connecting assembly that may be readily constructed of various sizes.

A final object of this invention to be specifically enumerated herein is to provide a connecting assembly in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 1 is a fragmentary side elevational view of a first form of connecting assembly being utilized to support a depending leg from an adjacent portion of a horizontal panel member;

FIG. 2 is an enlarged fragmentary vertical sectional view taken substantially upon the plane indicated by the section line 2—2 of FIG. 1;

FIG. 3 is a fragmentary vertical sectional view similar to FIG. 2 but with the supported leg illustrated in an angularly displaced retracted position;

FIG. 4 is a perspective view of the connecting assembly illustrated in FIGS. 1 through 3;

FIG. 5 is a perspective view of a second form of connecting assembly being utilized to connect adjacent ends of aligned pipe sections;

FIG. 6 is a fragmentary vertical sectional view taken substantially upon the plane indicated by the section line 6—6 of FIG. 5;

FIG. 7 is a side elevational view of the connecting assembly illustrated in FIGS. 5 and 6 and with the two sections thereof in angularly displaced positions;

FIG. 8 is a perspective view of a third form of connecting assembly constructed in accordance with the present invention; and FIG. 9 is an enlarged vertical sectional view taken substantially upon the plane indicated by the section line 9—9 of FIG. 8.

Referring now more specifically to the drawings, the numeral 10 generally designates a horizontal panel member such as a tabletop. The table-top 10 includes a depending peripheral fence 12 and a first form of connecting assembly referred to in general by the reference numeral 14 is utilized to secure a depending leg 15 to the tabletop 10.

From FIGS. 2 through 4 of the drawings it may be seen that the connecting assembly comprises a first section 16 and a second section 18. The first section 16 has a threaded blind bore 20 formed therein and the second section 18 has a threaded through bore 22 formed therein. The sections 16 and 18 are pivotally joined together as at 24 and the side of the section 16 remote from the side thereof through which the blind bore 20 opens is provided with a mounting flange 26 having mounting apertures 28 formed therethrough. A plurality of fasteners 30 are secured through the apertures 28 and in the underportion of the panel member 10 in order to secure the connecting assembly 14 to the panel member 10.

The section 18 is swingable to a position with its through bore 22 coaxial with the blind bore 20 and the bores 20 and 22 include coextensive threads 32 and 34.

The sides of the sections 16 and 18 through which the adjacent ends of the bores 20 and 22 open are coplanar and disposed in surface to surface abutting relation when the bores 20 and 22 are aligned. The leg 15 includes a threaded upper end portion 36 which is threadedly received through the through bore 22 and threadedly engaged and seated in the blind bore 20. In this manner, the threaded end portion of the leg 15 locks the sections 16 and 18 against relative angular displacement.

From FIG. 3 of the drawings, it may be seen that the leg 16 may be partially threaded out of engagement with the section 18 so as to retract the terminal end of the leg 15 from within the blind bore 20. As soon as the threaded end of the leg 15 has been withdrawn from within the section 16, the section 18 may be pivoted to the position thereof illustrated in FIG. 3 of the drawings with the leg 15 generally paralleling the underside of the table-top or panel member 10.

With attention now invited more specifically to FIGS. 5 through 7 of the drawings, a second form of connecting assembly is referred to in general by the reference numeral 40 and includes first and second sections 42 and 46 pivotally joined together as at 48 and provided with coaxial threaded bores 50 and 52 whose threads are coextensive. In addition, both of the bores 50 and 52 and through bores and the adjacent ends of the sections 42 and 44 are abutted against each other along an inner face which is disposed generally perpendicular to the center axes of the bores 50 and 52.

A first pipe section 56 has a threaded end 58 threaded in the bore 50 to a distance spaced from the adjacent end of the bore 52. A second pipe section 60 has a longer externally threaded end 62 threadedly engaged in the bore 52. The threaded end 62 of the pipe section 60 is threadable through the bore 52 and into the bore 50 in end-to-end abutted engagement with the adjacent end of the pipe section 56. In this manner, the threaded end 62 of the section 60 may be utilized to lock the sections 42 and 44 against relative angular displacement. Of course, when the threaded end 62 is retracted from the bore 50, the sections 42 and 44 may be relatively pivoted to the positions thereof illustrated in FIG. 7 of the drawings.

With attention now invited more specifically to FIGS. 8 and 9 of the drawings, there will be seen a third form of connecting assembly referred to in general by the reference numeral 66 and including first and second sections 68 and 70 relatively pivotally joined together as at 72. The section 70 comprises a substantial duplicate of the section 44 and the section 68 has a threaded blind bore 74 formed therein which is coaxial with the bore 76 formed in the section 70. Of course, the threads of the bore 76 are coextensive with the threads of the bore 74 and a pipe section such as the pipe section 60 may have its externally threaded end 62 threadedly engaged through the bore 76 and into the bore 74 for seated engagement therein. However, the section 68 also includes a threaded blind bore 78 disposed at generally right angles relative to the bores 74 and 76 and into which the externally threaded end of a pipe section such as the section 56 may be threadedly seated.

Of course, the connecting assemblies 40 and 66 are utilized to join adjacent pipe section ends which may be required to be pivoted relative to each other. In any event, it may be seen that each of the connecting assemblies 14, 40 and 66 may be used to releasably anchor the corresponding pipe sections 16 and 60 in predetermined position and yet release the pipe sections for limited angular displacement whenever desired.

It is also pointed out that the bore 78 need not be of the same size as the bores 74 and 76. Also, the end of the bore 50 remote from the bore 52 may be provided with a counterbore into which a larger pipe end may be threadedly seated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A connecting assembly comprising first and second sections pivotally supported from each other for relative angular displacement about a predetermined pivot axis between first and second relative positions, said sections defining coaxial threaded bores when said sections are in said first position with said axis extending transversely and disposed to one side of said bores closely adjacent the adjacent ends thereof, the bore in one of said sections comprising a through bore, and a threaded elongated member removably threadedly engageable through said through bore and into the bore in the other section when said sections are in said first positions, the other of said sections including abutment means engageable by the terminal end of said threaded member limiting threaded penetration of said threaded member into the bore in said other section.

2. The combination of claim 1 wherein the bore in the other of said sections comprises a blind bore and said abutment means comprises the inner end of said blind bore.

3. The combination of claim 2 wherein the section in which the other of said bores is formed includes a mounting flange on the side of the last mentioned section remote from the side thereof through which said blind bore opens.

4. The combination of claim 1 wherein the bore in the other of said sections comprises a through bore, said abutment means comprising a second threaded member removably threaded into the end portion of the bore formed in the other section remote from said one section.

5. The combination of claim 1 wherein the threads in said bores are coextensive when said sections are in said first position.

6. The combination of claim 1 wherein the section in which the other of said bores is formed also includes a threaded blind bore disposed at an angle relative to said other bore.

* * * * *